United States Patent [19]

Hayashi

[11] Patent Number: 5,092,673
[45] Date of Patent: Mar. 3, 1992

[54] CAMERA WITH SELF-TIMER DEVICE

[75] Inventor: Naohiko Hayashi, Kanagawa, Japan

[73] Assignee: Canon Kabushiki Kaisha, Tokyo, Japan

[21] Appl. No.: 647,273

[22] Filed: Jan. 29, 1991

[30] Foreign Application Priority Data

Feb. 2, 1990 [JP] Japan .................................. 2-24152
Feb. 2, 1990 [JP] Japan .................................. 2-24153

[51] Int. Cl.⁵ ........................ G03B 17/40; G03B 19/12
[52] U.S. Cl. .................................. 354/152; 354/238.1
[58] Field of Search ............................ 354/152, 238.1

[56] References Cited

U.S. PATENT DOCUMENTS

4,152,058  5/1979  Numata et al. .................. 354/152
4,743,930  5/1988  Satoh ............................ 354/267.1

Primary Examiner—Michael L. Gellner
Attorney, Agent, or Firm—Fitzpatrick Cella Harper & Scinto

[57] ABSTRACT

In a camera provided with a self-timer device, manually selectable first and second modes are provided as a self-timer mode and, in the first mode, a mirror is moved upward just before the start of exposure after a time set by a self-timer device has been counted, while, in the second mode, exposure is started after the mirror has been moved upward and then the time set by the self-timer device has been counted.

4 Claims, 7 Drawing Sheets

CAMERA WITH SELF-TIMER DEVICE

BACKGROUND OF THE INVENTION

1. Field of the Invention

This invention relates to a self-timer device for a camera.

2. Description of the Related Art

In a conventional camera having a self-timer mode in which an exposure is started in a predetermined time after an exposure start switch has been depressed, when the self-timer mode is selected, the depression of the exposure start switch causes a mirror to be moved upward after the predetermined time and, thereafter, a leading curtain of the shutter travels.

Therefore, in the above conventional camera, a problem arises in that vibration due to the shock produced when the mirror is moved upward remains until the leading curtain travels, and thus an adequate photographing cannot be carried out or a taken photograph is blurred when a macro-photography is carried out or when a photography using a telephoto lens is carried out.

To solve this problems, a method is considered, in which in the case of a self-timer photography, a predetermined time begins to be counted after a mirror has been moved upward, and a shutter travels after the lapse of the predetermined time. However, with respect to a timing at which the mirror is moved upward, it is requested in the macro-photography or the like that the visual field be secured through the viewfinder until immediately before the start of exposure. To satisfy this request, the mirror must be moved upward just before a leading curtain of the shutter travels, as in the conventional camera. Thus, another problem arises if the mirror is unconditionary moved upward a predetermined time before the start of exposure. Further, recently a camera which enables a self-timer photography to be carried out by a remote-control device is proposed, wherein when a signal from the remote-control device is received, the camera counts a predetermined time and then causes a shutter to travel.

SUMMARY OF THE INVENTION

One aspect of the application is to provide a camera which has a first mode in which a mirror is moved upward just before the start of an exposure and a second mode in which the mirror is moved upward a predetermined time before the start of an exposure in a self-timer photography, and can arbitrarily select one of the first and second modes.

Another aspect of this application is to provide a self-timer photography camera, in which a self-timer time that is used when the camera is set to a self-timer photography mode by a member provided on the camera is different from a self-timer time that is used when the camera is set to the self-timer photography mode in response to a signal from a remote-control device.

Other objects of the present invention will be apparent from the embodiments explained with reference to the following drawings.

DETAILED DESCRIPTION OF THE PREFERRED EMBODIMENTS

The present invention will be described below in detail based on the embodiments shown in the drawings.

Figure 2:
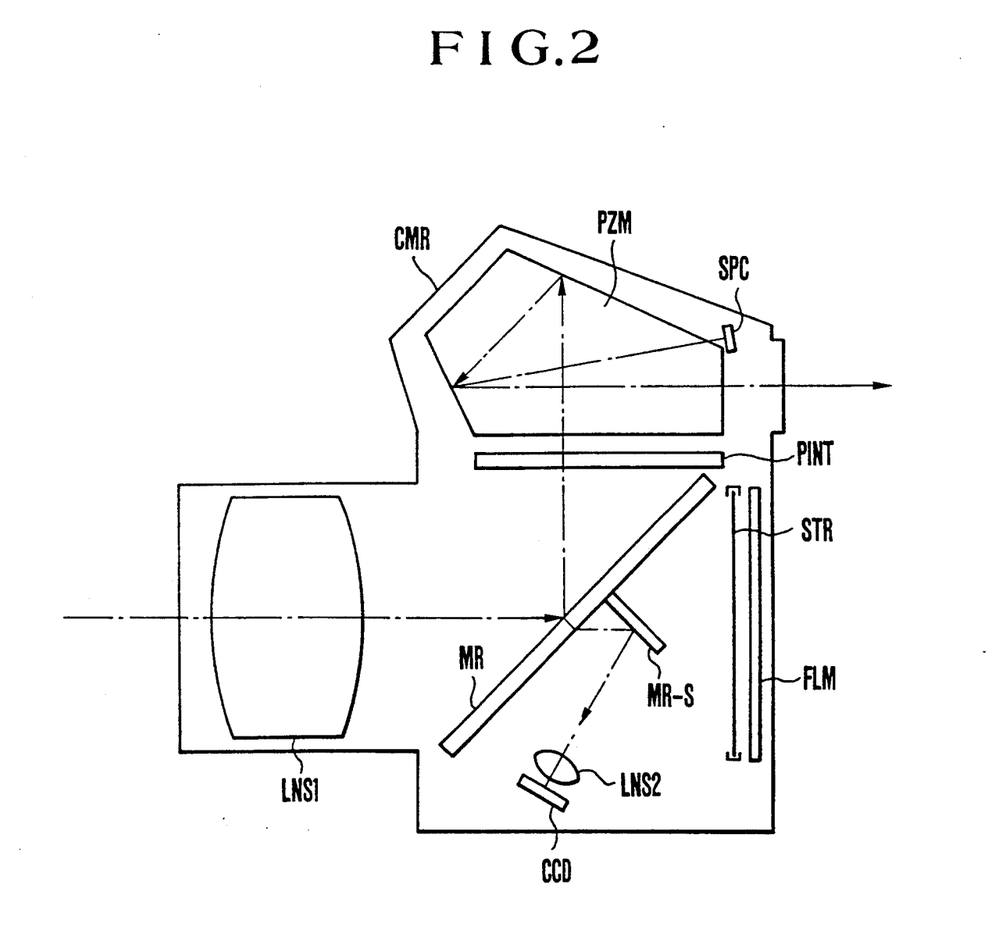
FIG. 2 is a block diagram showing a main part of the camera provided with the circuit shown in FIG. 1.

FIG. 2 is a block diagram showing a main part of the camera of the embodiment according to the present invention, wherein CMR designates a camera main body, LNS1 designates a photographing lens, MR designates a half-mirror, MR-S designates a sub-mirror, STR designates a shutter, FLM designates a film, LNS2 designates a distance measuring lens, CCD designates a line sensor located at a position equivalent to a film plane for taking in image information of an object, PZM designates a pentagonal prism, SPC designates a photodiode for measuring the luminance of the object, PINT designates a focusing screen.

Figure 1:
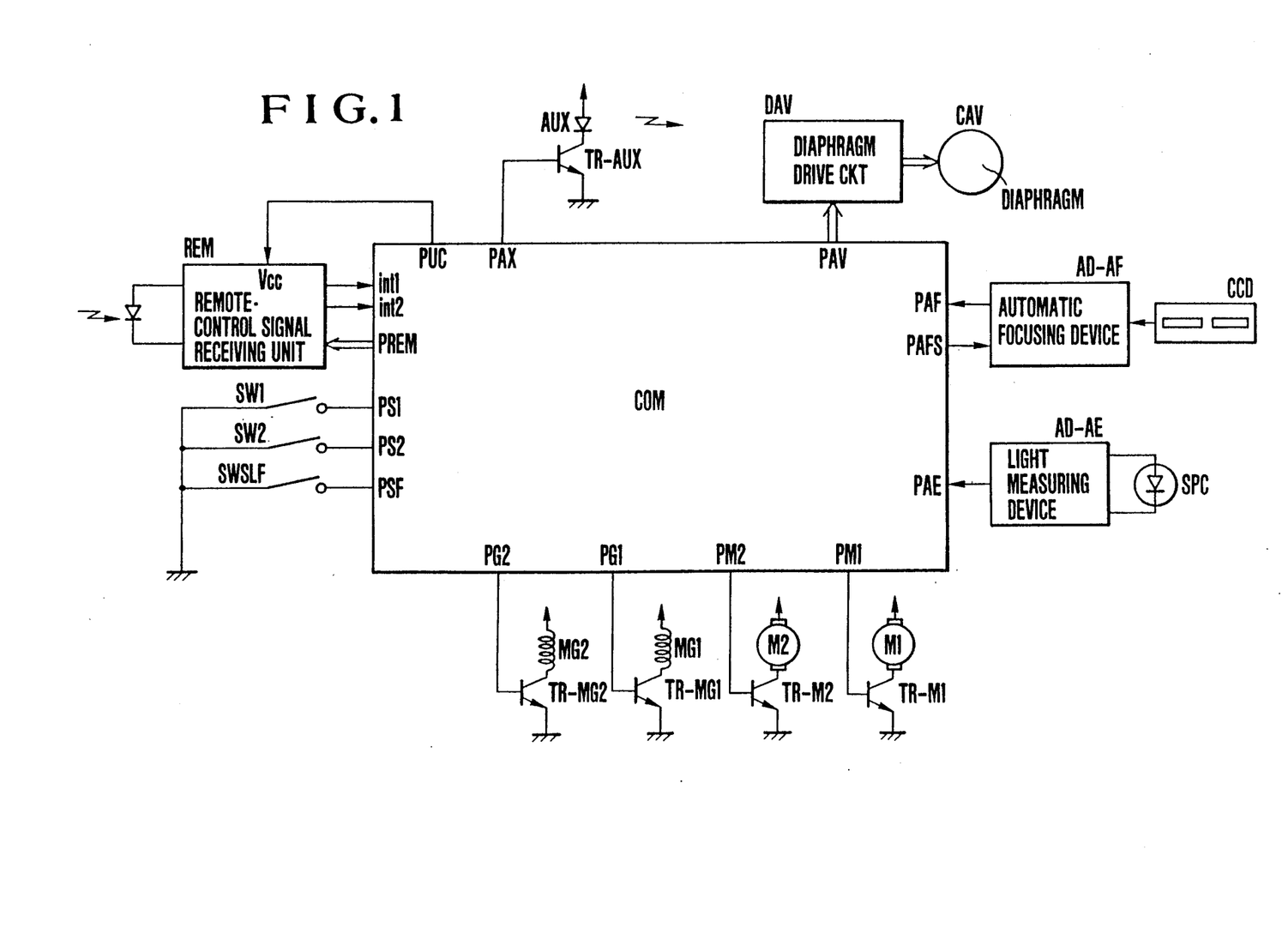
FIG. 1 is a circuit diagram showing an embodiment of a camera provided with a self-timer device according to the present invention.

FIG. 1 shows a block diagram of the electric circuit incorporated in the camera main body CMR shown in FIG. 2.

In FIG. 1, COM designates a microcomputer having input ports int1, int2, PS1, PS2, PSF, PAE and PAF; output ports PM1, PM2, PG1, PG2, PAX, PUC and PAFS; and 8-bit output ports PAV and PREM, for controlling various operations of the camera main body CMR.

AD-AF designates a well-known automatic focusing device for adjusting focus by effecting a defocusing calculation and driving the lens in accordance with an image signal produced by the line sensor CCD, and AD-AE designates a light measuring device for effecting a logarthmically compressing A/D conversion of a voltage obtained from the above photodiode SPC.

TR-M1, TR-M2, TR-MG1, TR-MG2 and TR-AUX designate transistors, M1 designates a motor for winding and rewinding the film, M2 designates a motor for moving the half-mirror MR upward and downward and for charging a shutter, MG1 designates a magnet for causing a leading curtain to travel by energization, and MG2 designates a magnet for causing a trailing curtain to travel by energization.

DAV designates a diaphragm drive circuit for controlling a diaphragm CAV in accordance with the number of steps of the diaphragm input from the above output port PAV. REM designates a remote-control signal receiving unit capable of receiving two remote-control signals (a remote-control signal 1 and a remote-control signal 2). When the remote-control signal receiving unit REM is supplied with electric power from the output port PUC of the microcomputer COM and a signal for permitting the reception of the remote-control signal from the output port PREM thereof, the remote-control signal receiving unit REM is set to a remote-control signal receiving state, and when receiving the remote-control signal 1 in this state, the unit REM continuously outputs Hi (which means a high level signal) to the port int1 unit the microcomputer COM has read the signal, and when receiving the remote-control signal 2, the unit REM continuously outputs Hi to the port int2.

AUX designates an infrared light emitting diode used as an AF auxiliary light for assisting a focusing operation by irradiating a pattern light to the object when the object is in low contrast and has low luminance, and the infrared light emitting diode AUX is also used for a self-timer indication in a self-timer remote-control mode.

SW1 designates a light measuring switch which is turned on by a first stroke of a release button, SW2 designates an exposure start switch which is turned on by a second stroke of the release button, and SWSLF designates a self-timer remote-control switch for selecting the self-timer remote-control mode.

Next, operation will be described with reference to the flowcharts shown in FIGS. 3A and 3B.

Figure 3A:
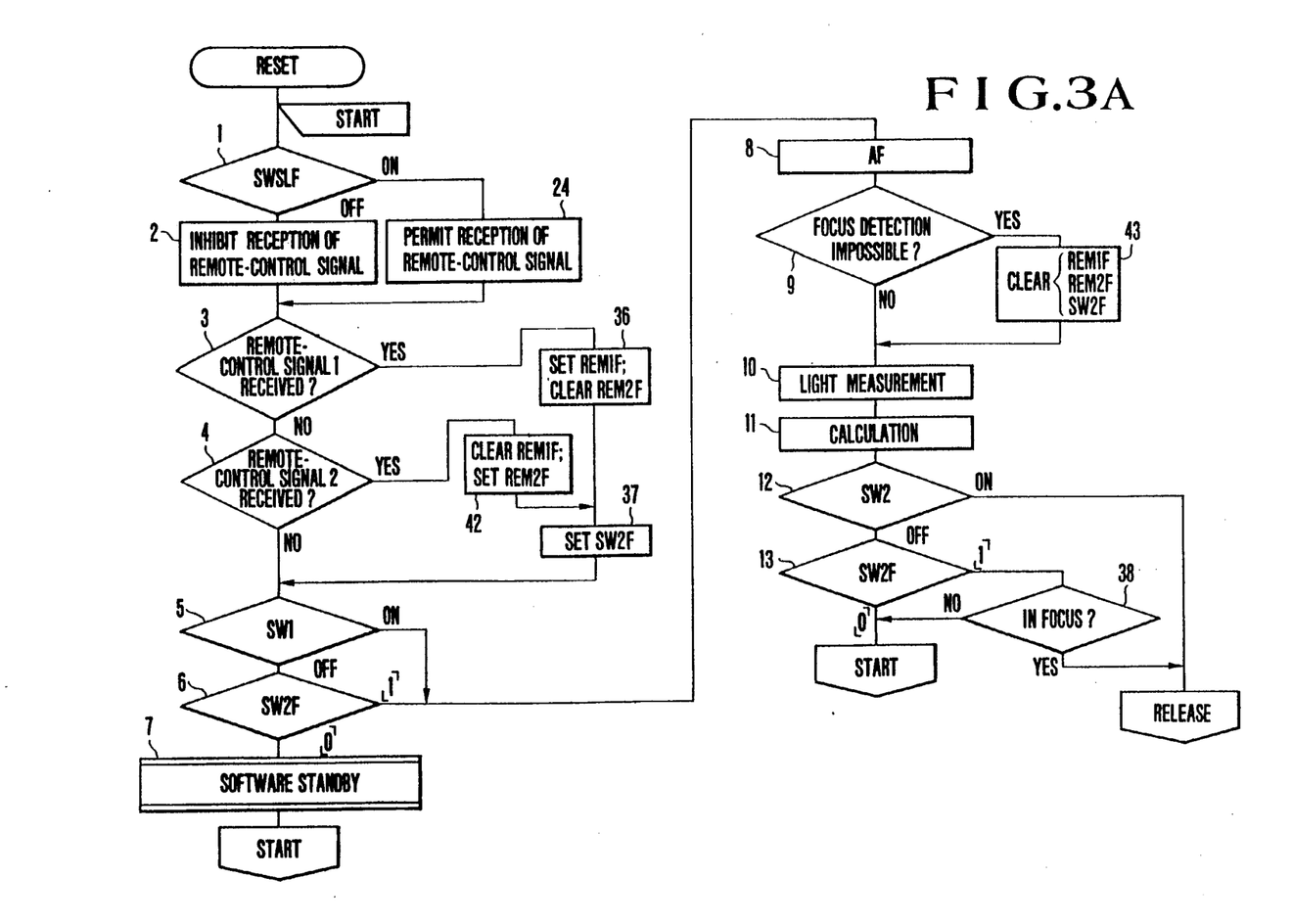
FIGS. 3A and 3B are flowcharts explaining a programmed flow of a microcomputer incorporated in the camera shown in FIG. 1.

When electric power is supplied to the camera main body CMR, the RAM in the microprocessor COM is completely cleared and the respective I/O ports thereof are initialized to start the operation from step 1 in FIG. 3A.

(Step 1) The state of the self-timer remote-control switch SWSLF is determined. When the input port PSF is a Lo (which means a low level signal), the process goes to step 24, and when the input port PSF is at Hi, the process goes to step 2.

(Step 2) Power supplied from the output port PUC of the microcomputer COM to the remote-control signal receiving unit REM is stopped, and a signal is sent from the output port PREM to inhibit the reception of the remote-control signal, and the process goes to step 3.

(Step 3) It is determined whether the remote-control signal 1 is received by the remote-control signal receiving unit REM. When receiving the remote-control signal 1, the remote-control signal receiving unit REM outputs Hi to the input port int1 of the microcomputer COM, and when the microcomputer COM reads the Hi, the remote-control signal receiving unit REM outputs Lo to the input port int1. More specifically, when the input port int1 is at "1", the operation of the microcomputer COM goes to step 36, and when the input port int1 is at "0", the operation of the microcomputer COM goes to step 4.

(Step 4) It is determined whether the remote-control signal 2 is received by the remote-control signal receiving unit REM. When receiving the remote-control signal 2, the remote-control signal receiving unit REM outputs Hi to the input port int2 of the microcomputer COM, and when the microcomputer COM reads the Hi, the remote-control signal receiving unit REM outputs Lo to the input port int2. More specifically, when the input port int2 is at "1", the operation of microcomputer COM goes to step 42, and when the input port int2 is at "0", the operation of the microcomputer COM goes to step 5.

(Step 5) The state of the light measuring switch SW1 is determined. When the input port PS1 is at Lo, the process goes to step 8, and when the input port PSI is at Hi, the process goes to step 6.

(Step 6) It is determined whether a flag SW2F, which is to be set when the remote-control signal is received, is set. When the flag SW2F is set, the process goes to step 8, and when the flag SW2F is cleared, the process goes to step 7.

(Step 7) The microcomputer COM is set to a software standby state. Since in the software standby state, not only the function of the microcomputer COM as a whole but also the functions of the incorporated peripheral modules including a clock and the like are stopped, a current consumption is greatly reduced. However, as far as a specified voltage is supplied, the content of the register in the microcomputer COM and the data of the incorporated RAM are retained. Further, the software standby state is cancelled by the drop of a power supply voltage, a change of the switch SW1, and a change of the self-timer remote-control switch SWSFL.

When the light measuring switch SW1 is depressed, the software standby state is cancelled, and the process goes to step 8 from step START through step 1, step 2, step 3, step 4 and step 5.

(Step 8) The automatic focusing device AD-AF is actuated in response to a signal from the port PAFS to carry out a well-known focus detecting operation, the lens is driven by a lens drive motor (not shown) provided in the device, and the process goes to step 9.

(Step 9) Image signal processing data used for the focus detecting operation carried out by the above automatic focusing device AD-AF is input to determine whether the focus detecting operation is possible. When the object is located at a distant position which the AF auxiliary light cannot reach and the object is in low contrast and has low luminance, the focus detection is determined to be impossible, and the process goes to step 43. Otherwise, the process goes to step 10.

(Step 10) Data input from the photodiode SPC is subjected to a logarithmically compressing A/D conversion to carry out a well-known light measuring operation, and the process goes to step 11.

(Step 11) A shutter speed and an aperture vale based on the measured light value are read from a program chart table stored in the RAM of the microcomputer COM, and the process goes to step 12.

(Step 12) The state of the exposure start switch SW2 is determined. When the input port PS2 is at Lo, the process goes to (RELEASE) in FIG. 3B, and when the input port PS2 is at Hi, the process goes to step 13.

(Step 13) It is determined whether the above flag SW2F, which is to be set when the remote-control signal is received, is set. When the flag SW2F is set, the process goes to step 38, and when the flag SW2F is cleared, the process returns to (START).

As described above, while the light measuring switch SW1 is turned on, the process goes to step 13 from step 1 through step 2, step 3, step 4, step 5, step 8, step 9, step 10, step 11 and step 12 and then returns to step 1 to repeatedly carry out the focus detecting operation and light measuring operation.

Next, a process to be carried out when the exposure start switch SW2 is turned on will be described.

Figure 3B:
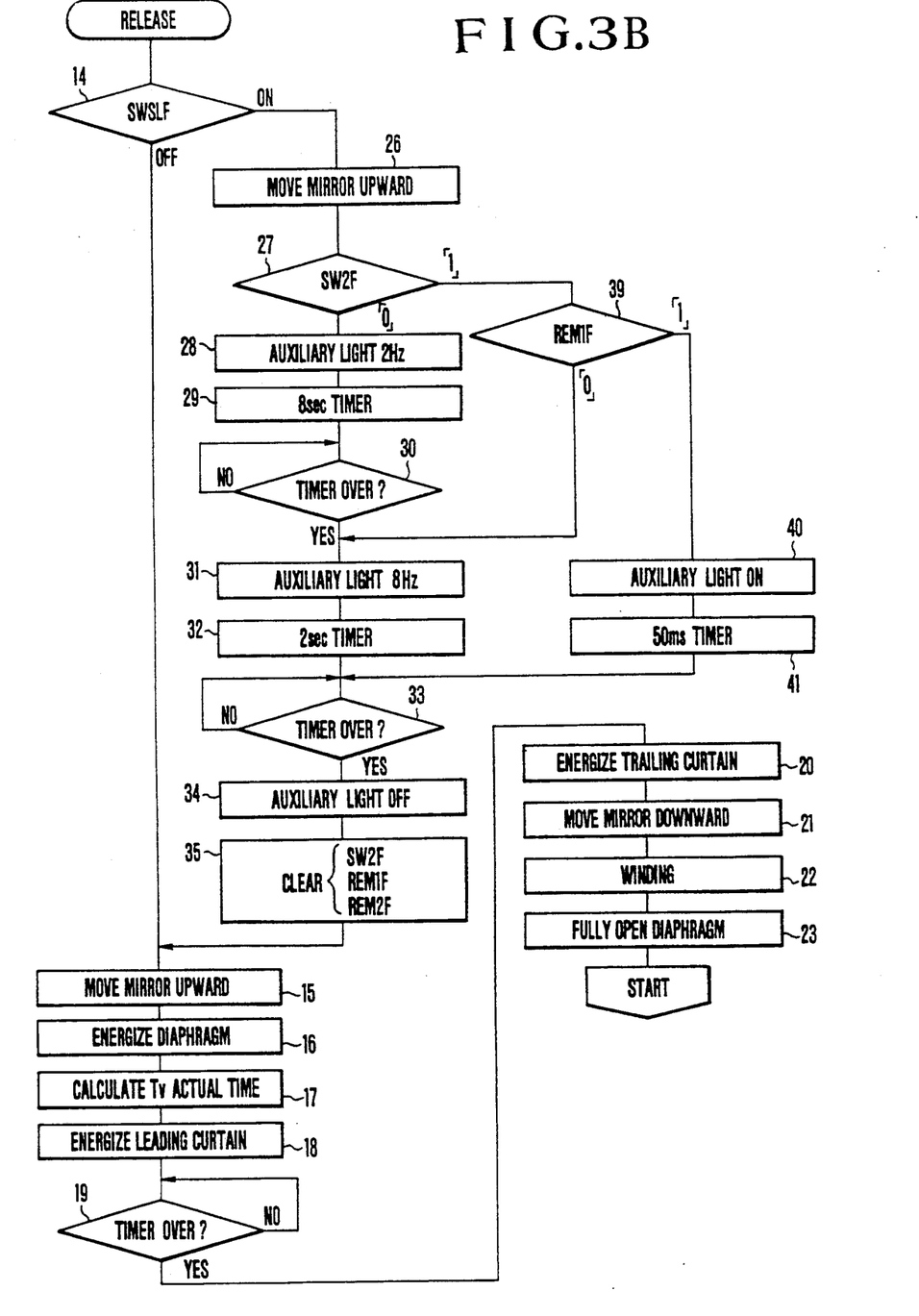

When the exposure start switch SW2 is turned on, the process of the microcomputer COM goes to (RELEASE) shown in FIG. 3B from step 12.

(Step 14) The state of the self-timer remote-control switch SWSLF is determined. When the input port PSF is at Lo, the self-timer remote-control mode is selected, and thus the process goes to step 26, and when the input port PSF is at Hi, the process goes to step 15.

(Step 15) When the mirror is not moved upward, Hi is output from the output port PM2 for a predetermined time to move the mirror upward by driving the motor M2, and the process goes to step 16.

(Step 16) The aperture value determined in step 11 is supplied to the diaphragm drive CIRCUIT DAV from the output port PAV to control the diaphragm CAV, and the process goes to step 17.

(Step 17) An actual shutter time is calculated from the APEX value of the shutter speed determined in step 11 and is set at the self-timer device, and the process goes to step 18.

(Step 18) The output port PG1 outputs Hi to cause the shutter leading curtain to travel by energizing the magnet MG1, and the process goes to step 19.

(Step 19) The process waits for a timer to pass the actual time and goes to step 20.

(Step 20) The output port PG2 outputs Hi to cause the shutter trailing curtain to travel by energizing the magnet MG2, and the process goes to step 21.

(Step 21) Hi is output to the output port PM2 for a predetermined time to move the mirror downward and to charge the shutter by energizing the motor M2, and the process goes to step 23.

(Step 22) Hi is output to the output port PM1 to wind the film by driving the motor M1, and the process goes to step 23.

(Step 23) The diaphragm driving circuit DAV fully opens the diaphragm CAV, and the process returns to (START) in FIG. 3A.

As described above, the release operation caused by the turning-on of the exposure start switch SW2 is carried out in step 14 to step 23.

Next, the self-timer remote-control mode into which the camera comes when the self-timer remote-control switch SWSLF is turned on will be described.

When the self-timer remote-control switch SWSLF is turned on, the process of the microcomputer COM goes to step 24 from step 1.

(Step 24) Electric power is supplied from the output port PUC of the microcomputer COM to the remote-control signal receiving unit REM, and the output port PREM sends a signal for permitting the reception of the remote-control signal to permit the reception of the remote-control signal. Then, the process goes to step 3.

At this time, when the exposure start switch SW2 is turned on, the process of the microcomputer COM goes to step 26 from step 3 through step 4, step 5, step 8, step 9, step 10, step 11, step 12 and step 14.

(Step 26) Hi is output to the output port PM2 for a predetermined time to move the mirror upward by driving the motor M2, and the process goes to step 27.

(Step 27) It is determined whether the above flag SW2F is set or not. When the flag SW2F is set, the process goes to step 36, and when the flag SW2F is cleared, the process goes to step 28.

(Step 28) The output port PAX outputs a pulse signal of 2 Hz to turn on and off the above infrared light emitting diode AUX (auxiliary light) by 2 Hz, and the process goes to step 29.

(Step 29) An eight-second timer is started, and the process goes to step 30.

(Step 30) The process waits for the above timer to expire and goes to step 31.

(Step 31) The output port PAX outputs a pulse signal of 8 Hz to turn on and off the above infrared light emitting diode AUX by 8 Hz, and the process goes to step 32.

(Step 32) A two-second timer is started, and the process goes to step 33.

(Step 33) The process waits for the above timer to expire and goes to step 34.

(Step 34) Lo is output to the output port PAX to turn off the above infrared light emitting diode AUX used as the self-timer indication, and the process goes to step 35.

(Step 35) The above flag SW2F, a flag REM1F to be set when the remote-control signal 1 is received and a flag REM2f to be set when the remote-control signal 2 is received are cleared, and the process goes to step 15.

Thereafter, the process goes to step 23 from step 15 through step 16, step 17, step 18, step 19, step 20, step 21 and step 22 to complete the release operation. Note, since the mirror has been moved upward at step 26, the mirror is not substantially moved upward at step 15.

When the exposure start switch SW2 is turned on to effect the release operation in the self-timer remote-control mode as described above, after the infrared light emitting diode AUX (auxiliary light) has been turned on and off for the time set by the self-timer device, i.e., after the auxiliary light has been turned on and off by 2 Hz for 8 seconds, the infrared light emitting diode AUX is turned on and off by 8 Hz for 2 seconds, and then a usual release operation is carried out.

Next, the release operation to be performed when the remote-control signal 1 is received in the self-timer remote-control mode will be described.

When the remote-control signal receiving unit REM receives the remote-control signal 1, Hi is output to the input port int1 of the microcomputer COM, and the process of the microcomputer COM goes to step 36 from step 3.

(Step 36) The flag REM1F indicating that the remote-control signal 1 is received is set and the flag REM2F indicating that the remote-control signal 2 is received is cleared, and the process goes to step 37.

(Step 37) The flag SW2F indicating that the remote-control signal is received is set, and the process goes to step 5.

Thereafter, the process goes to step 38 from step 5 through step 6, step 8, step 9, step 10, step 11, step 12 and step 13.

(Step 38) It is determined whether an in-focus state is attained by the above focus detecting operation effected in step 8. When the in-focus state is not attained, the process goes to (START), and when the in-focus state is attained, the process goes to (RELEASE).

Thereafter, the process goes to step 39 from step 14 through step 26 and step 27.

(Step 39) It is determined whether the above flag REM1F is set. When the flag REM1F is cleared, the process goes to step 31, and when the flag REM1F is set, the process goes to step 40.

(Step 40) Hi is output from the output port PAX to turn on and off the infrared light emitting diode AUX, and the process goes to step 41.

(Step 41) A 50-millisecond timer is started, and the process goes to step 33.

Thereafter, the process goes to step 23 from step 33 through step 34, step 35, step 15, step 16, step 17, step 18, step 19, step 20, step 21 and step 22 to complete the release operation. Note, since the mirror also has been moved upward at step 26, the mirror is not substantially moved upward at step 15.

When the release operation is carried out by receiving the remote-control signal 1 in the self-timer remote-control mode as described above, after the infrared light emitting diode AUX (auxiliary light) has been turned on for 50 milliseconds as the time set by the self-timer device at this time, a usual release operation is carried out.

Next, the release operation to be performed when the remote-control signal 2 is received will be described.

When the remote-control signal receiving unit REM receives the remote-control signal 2, Hi is output to the input port int2 of the microcomputer COM, and the process of the microcomputer COM goes to step 42 from step 4.

(Step 42) The flag REM2F indicating that the remote-control signal 2 is received is set and the flag REM1F indicating that the remote-control signal 1 is received is cleared, and the process goes to step 37.

Thereafter, the process goes to step 38 from step 37 through step 5, step 6, step 8, step 9, step 10, step 11, and step 12 and step 13. When it is determined that the in-focus state is attained at step 38, the process goes to step 23 from step 14 through step 26, step 27, step 39, step 31, step 32 step 33, step 34, step 35, step 15, step 16, step 17, step 18, step 19, step 20, step 21 and step 22 to complete the release operation.

When the release operation is carried out by receiving the remote-control signal 2 in the self-timer remote-control mode as described above, after the infrared light emitting diode AUX has been turned on and off for 2 seconds as the time set by the self-timer device, a usual release operation is carried out.

Next, the operation, in which it is determined that the focus detecting operation cannot be carried out although the remote-control signal is received, will be described.

When it is determined that the focus detecting operation cannot be carried out, the process of the microcomputer COM goes to step 43 from step 9.

(Step 43) The above flag REM1F, REM2F and SW2F are cleared, and the process goes to step 10.

Thereafter, the process goes to step 7 from step 10 through step 11, step 12, step 13, step 1, step 24, step 3, step 4, step 5 and step 6, where the process is in a software standby state. More specifically, when receiving the remote-control signal, the camera main body CMR repeats the focus detecting operation and light measuring operation until the in-focus state is attained, and when the in-focus state is attained, the process goes to (RELEASE). Further, when it is determined that the focus detecting operation cannot be carried out, the focus detecting operation and light measuring operation are terminated, and the process goes to the software standby state.

According to the present embodiment, since the mirror is moved upward before the self-timer device begins to count the time set thereby in the self-timer remote-control mode, photographs to be taken are prevented from being blurred by shock caused when the mirror is moved upward. More specifically, when photographing is carried out in such a situation that a camera is easily subjected to vibration due to shock caused when the mirror is moved upward (such as a macro-photography, a photography using a telephoto lens), a photographer can take a photograph which is not blurred by the shock of the mirror-moving-upward operation by setting the camera to the self-timer remote-control mode, because blurring due to the shock caused by the mirror-moving-upward operation is not produced.

In the present embodiment, the mirror is moved upward before the self-timer beings to count the time set thereby in the self-timer remote-control mode, but a time during which photographing is affected by the shock of the mirror-moving-upward operation is "100 milliseconds or less at the longest, and thus when a time set by the self-timer device is "2 seconds", a similar effect can be provided in such a manner that the mirror is moved upward within "1900 milliseconds" after the self-timer device begins to count the time set thereby.

Figure 4:
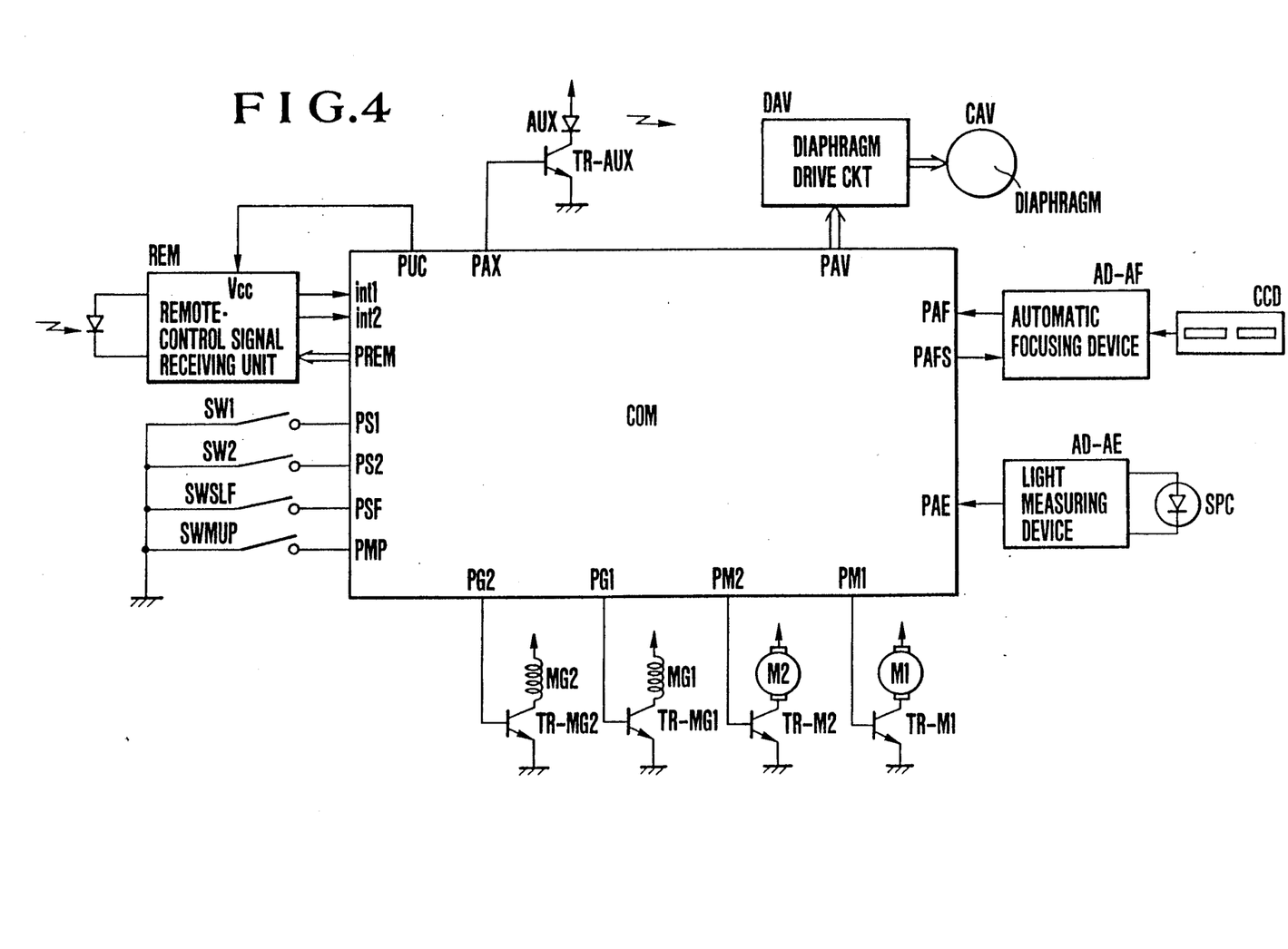
FIG. 4 is a circuit diagram showing another embodiment of the camera according to the present invention.

FIG. 4 is a block diagram of another embodiment of an electric circuit incorporated in the camera main body CMR shown in FIG. 2, wherein the same numerals as used in the arrangement of FIG. 1 are used to designate the same parts. The embodiment shown in FIG. 4 is the same as that of FIG. 1 except that a switch SWMUP is added in the embodiment in FIG. 4.

The switch SWMUP is a mirror-moving-upward selection switch to select whether the mirror is to be moved upward or not (whether the half-mirror MR is to be moved upward or not) before the self-timer device begins to count a time set thereby in the self-timer remote-control mode. When a photographer wants to prevent a photograph from being blurred by the vibration caused by the mirror-moving-upward operation, the photographer turns on the switch SWMUP, and when the photographer rather wants to observe a field of view until immediately before the start of exposure, the photographer turns off the switch SWMUP.

Figure 5A:
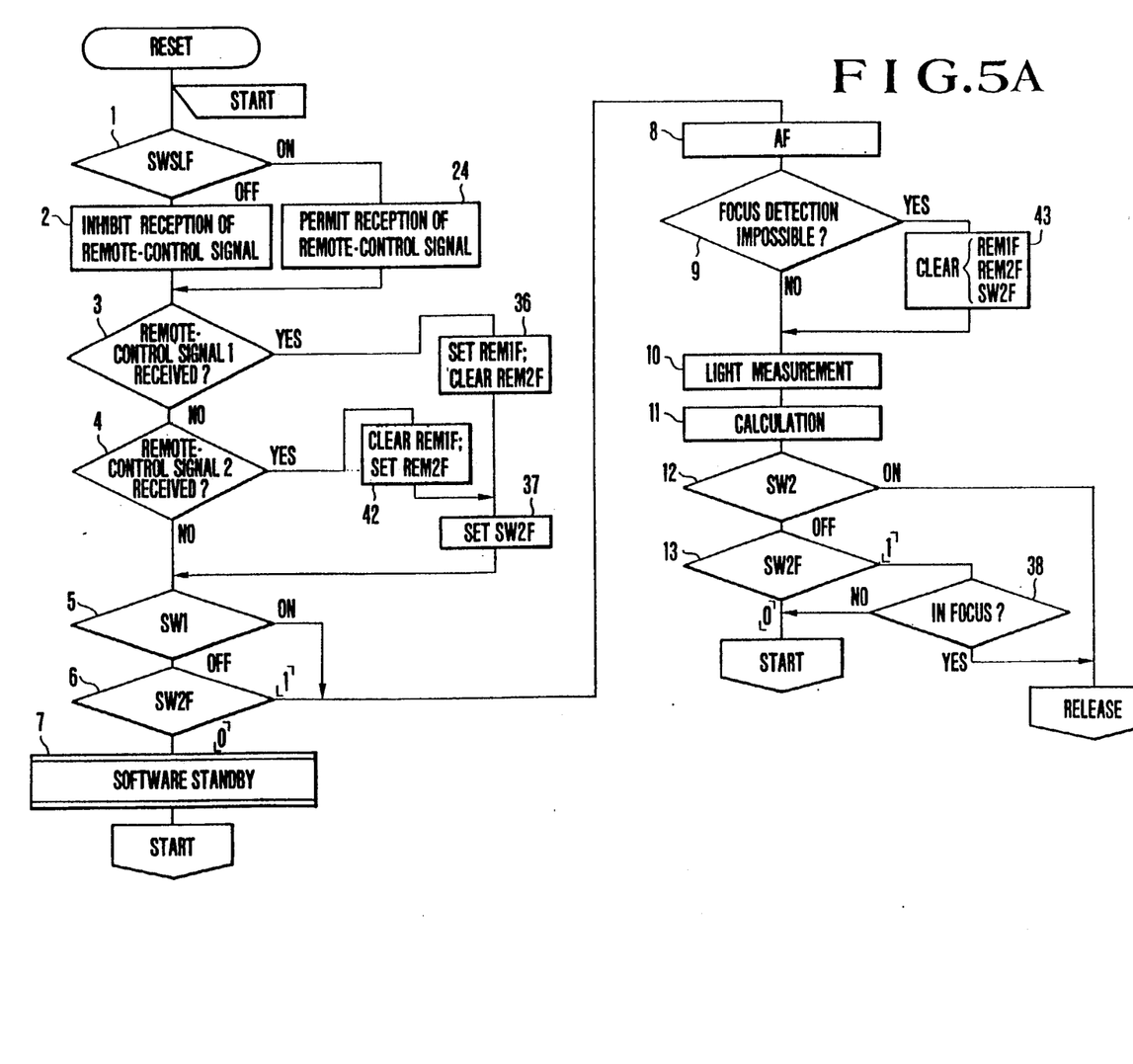
FIGS. 5A and 5B are flowcharts explaining a programmed flow of a microcomputer incorporated in the camera shown in FIG. 4.
Figure 5B:
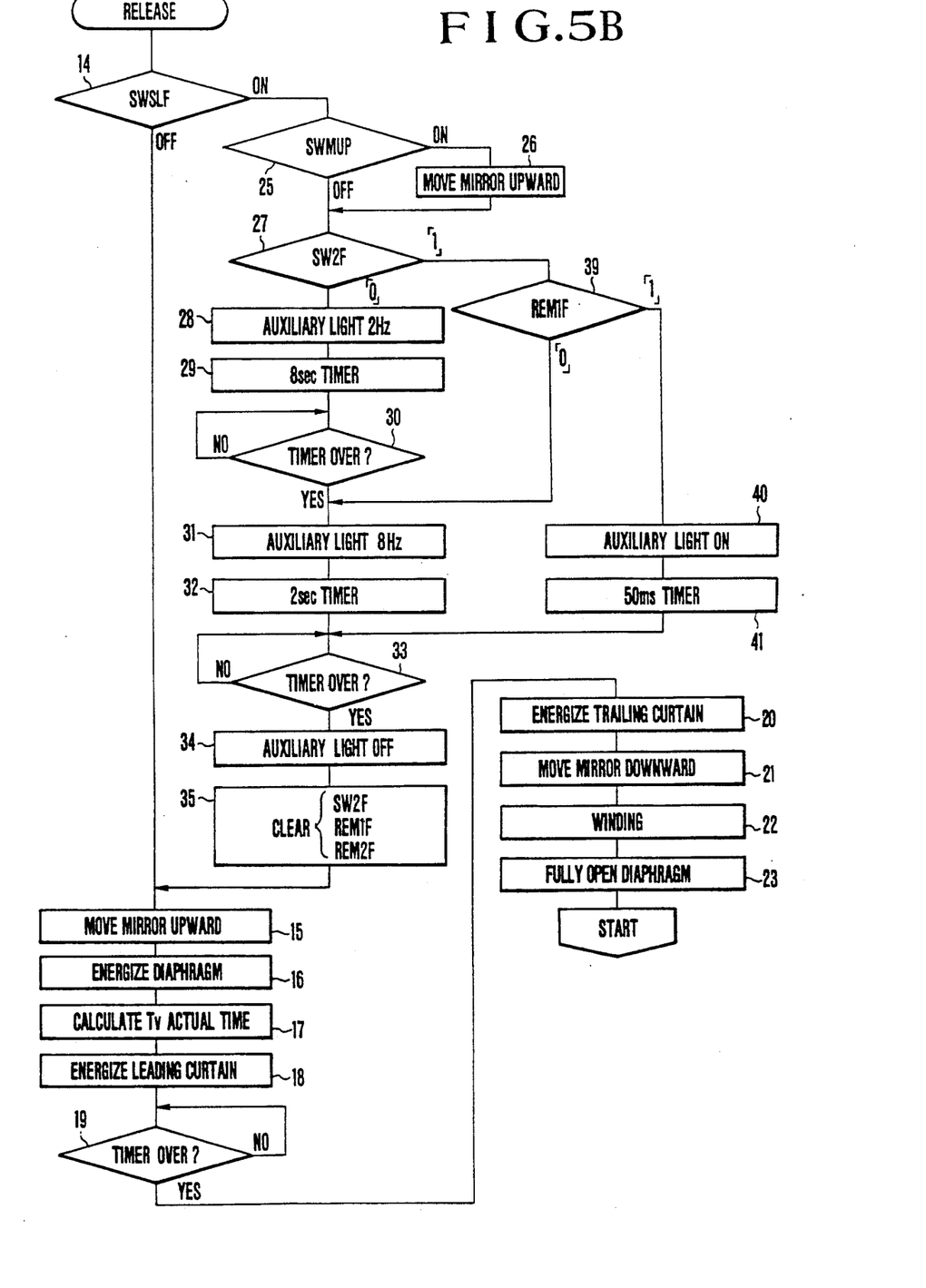

FIGS. 5A and 5B are flowcharts showing the control program of the camera shown in FIG. 4.

Since the flowchart shown in FIG. 5A is the same as that shown in FIG. 3A, a detailed description thereof is omitted.

The flowchart shown in FIG. 5B is the same as that shown in FIG. 3B except that step 25 is added in the flowchart of FIG. 5B.

Next, the operation of the embodiment shown in FIG. 4 will be described with reference to FIGS. 5A and 5B.

Note, as described above, since FIGS. 5A and 5B are the same as FIGS. 3A and 3B except the above portions, when the switch SWMUP is turned on, the operation described with reference to FIGS. 1, 3A, and 3B is carried out, and thus a detailed description thereof is omitted.

Next, the operation when the switch SWMUP is turned off will be described. Since the flowchart shown in FIG. 5A is also the same as that shown in FIG. 3A, the same operations as those described with reference to FIG. 3A are carried out up to the release operation. In the flowchart of FIG. 5B showing steps subsequent to the release operation, when the self-timer remote-control mode is selected and the selection switch SWMUP is turned off, the mirror is not moved upward in step 26, and step 27 and subsequent steps are carried out. With this arrangement, when the switch SWMUP is turned off, the mirror is moved upward at step 15 just before the start of exposure even in the self-timer mode.

Since the operations in the flowchart shown in FIG. 5B are the same as those shown in FIG. 3B except the above, a detailed description thereof is omitted.

According to the present embodiment, whether the mirror is to be moved upward before the self-time device begins to count a time set thereby or the mirror is to be moved upward just after the self-timer device has finished counting the time set thereby is set in accordance with the state of the mirror-up-selection switch SWMUP in the self-timer remote-control control mode, and thus both the case in which a photograph is requested to be prevented from being blurred by the vibration caused by the mirror-moving-upward operation and the case in which a field of view is required to be observed until immediately before the start of exposure can be satisfied in the photographing.

What is claimed is:

1. A camera in which a mirror-up operation for moving a mirror upward is performed by a mirror-moving-upward mechanism, comprising:
   a) a timer circuit arranged to be operated in response to a release operation signal, said timer circuit counting a predetermined time, said timer circuit having a first mode in which said mirror-up operation is performed after said predetermined time has elapsed and a second mode in which said mirror-up operation is performed at least a period of time required for said mirror-up operation before said predetermined time finishes being counted; and
   b) a selection circuit for selecting said first mode or said second mode.

2. A camera according to claim 1, wherein in said second mode, said timer circuit begins to count said predetermined time after said mirror has been moved upward.

3. A camera according to claim 2, wherein said selection circuit selects one of said first and second modes by a manual operation.

4. A camera comprising:
   a) a mirror-moving-upward mechanism for performing a mirror-up operation;
   b) a timer circuit for counting a self-timer time;
   c) a control mechanism for causing an exposure operation to start;
   d) a sequence control circuit having a first mode and a second mode, wherein, in said first mode, after said timer circuit has finished counting the self-timer time, said mirror-moving-upward mechanism is actuated to perform the mirror-up operation and thereafter an exposure operation is started by said control mechanism, and in said second mode, said mirror-moving-upward mechanism is actuated a period of time required for said mirror-up operation before said timer circuit finishes counting the self-timer time, and an exposure operation is started by said control mechanism after the self-timer time has finished being counted; and
   e) a selection circuit for selecting said first mode or said second mode.

* * * * *

UNITED STATES PATENT AND TRADEMARK OFFICE
CERTIFICATE OF CORRECTION

PATENT NO. : 5,092,673                     Page 1 of 2

DATED      : March 3, 1992

INVENTOR(S): Hayashi

It is certified that error appears in the above-identified patent and that said Letters Patent is hereby corrected as shown below:

On title page, item
[56] ATTORNEY, AGENT OR FIRM:

"Fitzpatrick Cella Harper & Scinto" should read --Fitzpatrick, Cella, Harper & Scinto--.

COLUMN 1:

Line 25, "problems," should read --problem,--.

COLUMN 3:

Line 62, "PSI" should read --PS1--.

COLUMN 4:

Line 36, "vale" should read --value--.

COLUMN 7:

Line 17, "step 32" should read --step 32,--.

Line 64, "beings" should read --begins--.

Line 68, "milliseconds" should read --milliseconds"--.

UNITED STATES PATENT AND TRADEMARK OFFICE
CERTIFICATE OF CORRECTION

PATENT NO.   : 5,092,673

DATED        : March 3, 1992

INVENTOR(S)  : Hayashi

It is certified that error appears in the above-identified patent and that said Letters Patent is hereby corrected as shown below:

COLUMN 8:

Line 59, "self-time" should read --self-timer--.

Signed and Sealed this

Sixteenth Day of November, 1993

Attest:

BRUCE LEHMAN

Attesting Officer    Commissioner of Patents and Trademarks